Jan. 23, 1962 — F. ROBICSEK — 3,017,885
BLOOD FLOW METER
Filed March 30, 1959 — 2 Sheets-Sheet 1

INVENTOR.
FRANCIS ROBICSEK
BY
Parrott & Richards
ATTORNEYS

Jan. 23, 1962 F. ROBICSEK 3,017,885
BLOOD FLOW METER
Filed March 30, 1959 2 Sheets-Sheet 2

INVENTOR.
FRANCIS ROBICSEK
BY
Parrott & Richards
ATTORNEYS

United States Patent Office 3,017,885
Patented Jan. 23, 1962

3,017,885
BLOOD FLOW METER
Francis Robicsek, 1239 Salem Drive, Charlotte, N.C.
Filed Mar. 30, 1959, Ser. No. 802,721
3 Claims. (Cl. 128—214)

The present invention relates to means for measuring the flow of blood through an artificial heart-lung pumping system, and more particularly to a blood flow meter attached directly to the conduit through which blood flows from the heart-lung pump to the patient and includes means for measuring the drop in fluid pressure as the blood flows through a constriction in the conduit, the pressure drop being directly proportional to the rate of flow of the blood.

The development of the artificial heart-lung pump has been a significant advance in the field of cardiac surgery. Extracorporeal circulation relieves the heart of its functions and allows the surgeon to operate on a relatively bloodless and quiet heart while maintaining proper circulation of oxygenated blood through the body of the patient. Thus numerous surgical operations which can not be performed or are more difficult to perform on a functioning heart, can be safely performed by use of the heart-lung pump. Also the continued circulation provided by the heart-lung pump permits surgery for prolonged periods without injury to the patient.

One difficulty with the heart-lung pump is that it must be accurately controlled to avoid harming the patient, particularly as to the proper rate of flow of blood. Obviously, a complete stoppage of the flow of blood to a patient for even a short period is extremely dangerous, but deviations in the rate of flow can cause permanent, or even fatal, injury to the patient. Lack of oxygen resulting from a low rate of flow causes damage to the brain cells, whereas a high rate of flow may overload the patient's system sufficient to cause tissue damage. The heart pump must be controlled to operate within a close range. The amount of flow and safe deviations vary widely depending upon the physical characteristics of the patient, but means for sensing the actual rate of flow of blood to the patient are essential and critical to the successful operation of a heart-lung pump.

At the present time there are two methods for measuring blood flow through the heart machine, neither of which have proved to be satisfactory. One of these utilizes the height of blood in the venous reservoir of the heart-lung pump to indicate the pressure of the blood in the system, which is taken as an indication of blood flow. The other method utilizes the "calibration" on the venous and arterial pumps to indicate flow. Theoretically, the revolutions per minute are proportional to rate of flow, but only when other factors remain constant. In practice there are variables present which make both of these methods inaccurate and, at times, dangerously misleading. For example, if a clot or other impediment should occur in the system or in the patient, reducing the rate of flow or even stopping the flow of blood, the pressure would increase, erroneously indicating an increase in flow. Similarly, miscalculation would result if the conduit should rupture so that the blood flows rapidly out of the system. Also, variations of other factors, such as the circulatory resistance of the patient, produce misleading indications by these methods.

The blood flow meter of the present invention is based on the principle that the rate of flow of a fluid in a conduit is directly proportional to the pressure drop occurring as the fluid passes through a constriction. The meter does not rely on the pressure in the system, except as the pressure actually affects the rate of flow. Thus, when there is no flow in the system there will be no pressure drop and therefore no flow indicated on the meter regardless of actual pressure in the system.

The present flow meter utilizes an orifice-plate mounted directly in the conduit through which blood is pumped back into the patient. The pressure of the blood on each side of the orifice is sensed and transformed into electrical impulses by pressure sensitive transducers. The electrical impulses are supplied to an oscilloscope which electronically compares the impulses and registers the difference on a visual meter calibrated to read in terms of fluid flow. Alternatively or additionally the electrical comparison can be supplied to the pumping system controls to automatically control and monitor the heart-lung pumping system. In this sense, the flow meter actually serves as the brain for the entire system.

Heretofore constrictions and orifices generally have been avoided in blood pumping systems because the blood is easily damaged due to peculiar properties of the blood. When fluid passes through an orifice, a considerable turbulence is developed which does not affect most fluids, but when turbulence is created in the flow of blood the corpuscles are thrown against the sides of the conduit causing considerable damage, both by destruction of the red corpuscles (hemolysis) and by causing the emission of the solidifying or clotting component of the blood. This damage to the blood is not only harmful to the patient but can create a failure of the entire system. Further, an orifice-type flow meter has not been considered feasible in a heart pump because of the comparatively low fluid pressure which does not produce a substantial pressure drop as the fluid passes through the orifice and thus an insignificant and unworkable reading is obtained with convention orifice type flow meters.

The particular construction of the present flow meter overcomes the turbulence disadvantage by using an orifice of a diameter only slightly less than the inner diameter of the conduit. Thus there is little impediment to the flow of blood with little resulting turbulence. Therefore, hemolysis and clotting are substantially avoided. However, this relatively large orifice does not provide a substantial pressure drop especially in the low pressure system of a heart-lung pump. If the pressure drop is not of workable proportions, it can be amplified according to a modification of the present invention. This modification utilizes a transducer on the rear side of the orifice set at a relatively high sensitivity as compared with the sensitivity of the transducer on the other side of the orifice. With this arrangement, the pressure drop reading is amplified so that a practical visual observation may be made and an operator can use this indication to vary the operation of the pump. Alternatively this reading can be electronically incorporated in the pump controls so as to automatically vary the pump motors to maintain a substantially constant flow.

The present flow meter is independent of the other elements of the pumping system and therefore can be located in the return conduit adjacent the patient to give a true indication of the blood flow to the patient, which is not necessarily obtained when the flow meter is incorporated in a reservoir or pump where the resistance to flow of subsequent elements of the system may reduce the flow rate of the blood before it enters the patient. Further, no foreign material, such as a head of mercury, is required so that the danger of foreign matter entering the blood stream is eliminated and there are no storage compartments or by-pass conduits necessary, which could interfere with the operation, effectiveness and accuracy of the pumping system.

From the above it is apparent that the present invention provides a flow meter that is particularly adapted to measuring the flow of blood at the relatively low pressure and low rate of flow required in extracorporeal circulation systems. The reading obtained by the meter is independent of variables such as viscosity, temperature, resistance to circulation, etc., that render other types of blood flow meters inaccurate and no undesirable side effects, such as clotting or hemolysis, are produced.

Other and further features and advantages of the present invention will be apparent from the following description and drawings in which.

Figure 1:
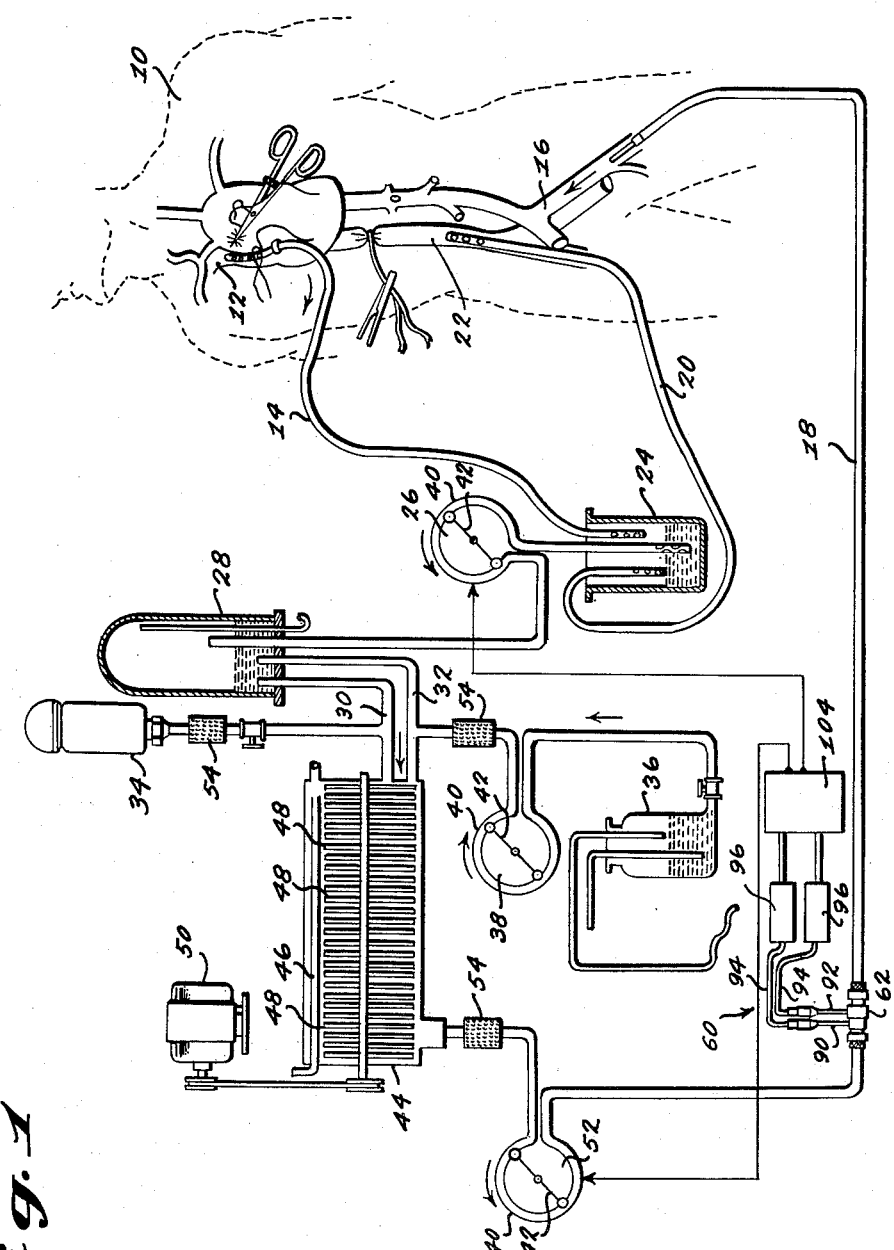
FIG. 1 is a diagrammatic illustration of a representative heart-lung pumping system having incorporated therein a blood flow meter according to the preferred embodiment of the present invention.

The blood flow meter of the present invention may be used with any type of artificial heart-lung pumping system. For purposes of illustration only, the pumping system shown and described is of the type developed and successfully used for heart surgery by the Heinman Foundation Laboratory for Cardio-Pulmonary Research at Charlotte Memorial Hospital, Charlotte, North Carolina. It is attached to a patient 10 so that the flow of blood bypasses the heart, with deoxygenated or used blood withdrawn from the great veins 12 and 22 through the intake conduit 14 and 20 and reoxygenated blood returned to one of the great arteries 16 through the return conduit 18. The blood is drawn into a gravity reservoir 24 and a venous pump 26 pumps blood from the gravity reservoir 24 into the central reservoir 28 which maintains a supply of blood to insure continued operation and is transparent to permit visual inspection.

The blood flows from the central reservoir 28 to an oxygenator 44 through two conduits 30 and 32. One of these conduits 30 is also attached to a supply of blood 34 for priming and replacement. The other conduit 32 leading to the oxygenator supplies blood from a suction reservoir 36 which receives blood from the patient, such as in the area of the operating cavity. This blood is supplied to the oxygenator by the suction pump 38, which is operated only when the blood supply in the system is undesirably low.

The oxygenator 44 mixes the blood from the conduits 30 and 32 with oxygen supplied through the perforated tube 46. Mixing is accomplished by rotating mixing discs 48 driven by the motor 50 with the resulting oxygen content of the blood being substantially the same as that provided by the human lung. Reoxygenated blood is pumped from the oxygenator 44 by the arterial pump 52 which forces the blood through the return conduit 18 to the patient for circulation through the patient's body. In order to avoid the circulation of impurities through the patient's body, filters 54 are located at important points in the system.

The above mentioned venous pump 26, suction pump 38 and arterial pump 52 are squeeze type pumps in which the conduit 40 is arranged in a circle with a double ended rotor 42 advancing the blood by squeezing the conduit 40 as it rotates. These pumps are of relatively low capacity with a resulting low pressure which is suitable for a heart pump but would not normally produce satisfactory results with an orifice-type flow meter.

The above described heart-lung pumping system illustrates one type of system in which the blood flow meter of the present invention may be incorporated but it is to be understood that the present invention is not limited to this particular system, as it is equally adaptable to other types of extracorporeal circulating systems.

The flow meter of the present invention is indicated generally at 60 and includes a conduit section 62 mounted in the return conduit 18 of the heart-lung pumping system. A pair of pressure sensitive transducers 96 sense the pressure in the conduit section 62 and transmit electrical impulses corresponding to the pressures to an oscilloscope 104 which indicates the pressure differential in terms of rate of blood flow.

The conduit section 62 includes a rear hose connection 64, a rear pipe portion 66, an orifice plate 86, a front pipe portion 74, a front hose connection 84 and rear and front pressure tubes 90, 92. The rear hose connection 64 seats on the rear end of the rear pipe portion 66 and the front hose connection 84 seats on the front end of the front pipe portion 74. The hose connections 64 and 84 are internally threaded to engage the external threads 70 and 80 on the pipe portions 66 and 74, respectively. The connectors and pipe portions bind the return conduit 18 therebetween with annular ribs 68 on the pipe portions 66 and 74 and internal flanges 82 on the connectors securing and sealing the conduit in place.

The forward end of the rear pipe portion 66 is externally threaded at 72 for engagement with the internally threaded and enlarged rear end 76 of the front pipe portion 74. The enlarged rear end 76 of the front pipe portion 74 has an annular shoulder 77 spaced from the rear pipe portion 66 to provide an annular space 78 within which is mounted an orifice plate 86.

The orifice plate 86, mounted in the annular space 78 between the pipe portions 66 and 74, is provided with a circular orifice 88 in its center through which the blood flows and which creates a drop in fluid pressure directly proportional to the rate of flow of the blood. Thus a measurement of the drop in pressure through the orifice can be used to determine the rate of blood flow. Pressure readings are obtained by mounting a rear pressure tube 90 in the rear pipe portion 66 adjacent the orifice plate 86, with the interior of the pipe portion, and a front pressure tube 92 mounted in the front pipe portion 74 adjacent the orifice plate 86. Since the pressure of the blood builds up downstream from the orifice plate 86, the front tube 92 is located close to the plate to obtain a maximum pressure differential reading.

Figure 2:
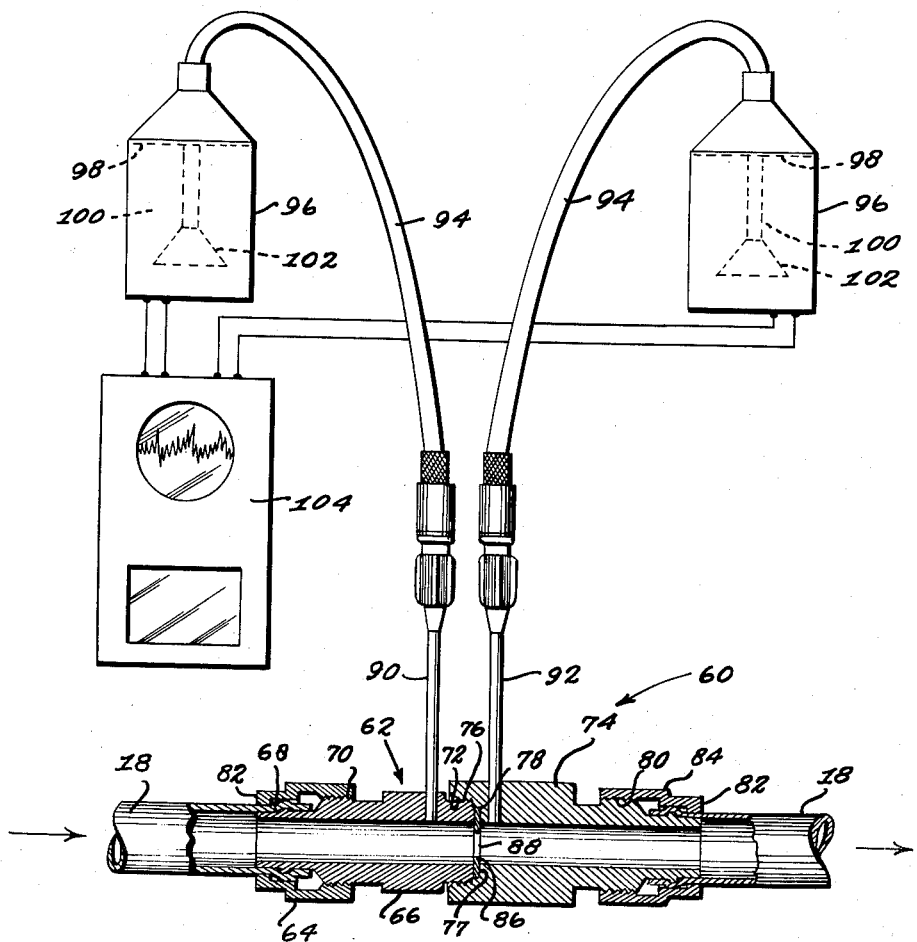
FIG. 2 is an enlarged view partially in section, of the flow meter incorporated in FIG. 1.
Figure 3:
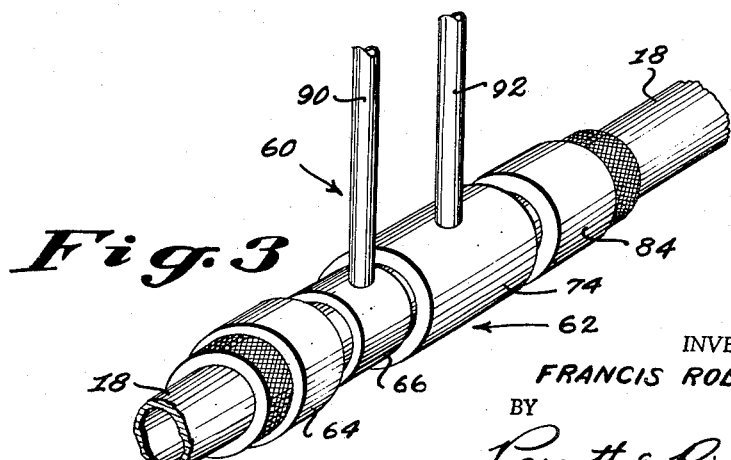
FIG. 3 is an enlarged perspective view of a portion of the flow meter of FIG. 2.

Conduits 94 lead from the pressure tubes 90, 92 to pressure sensitive transducers 96, which may be of any conventional design. The present invention is not to be limited to any particular type of transducer, but for purposes of illustration the transducers 96 shown diagrammatically in FIGS. 1 and 2 have diaphragms 98 responsive to the pressure of the blood in the conduits 94. The diaphragms 98 transmit the pressure to a fluid 100 inside the transducers 96. The pressure of this fluid 100 is detected by pressure sensitive elements 102 which vary the resistance in Wheatstone Bridges, creating electrical impulses. The impulses from the transducers 96 are fed into a conventional oscilloscope 104, which compares the impulses and indicates the differential pressure in terms of the proportional rate of blood flow. It is measured and indicated simultaneously with other biological measurements and, being a pressure indicating device, it is compatible with the conventional equipment for measuring other biological factors such as arterial and venous blood pressure.

In operation, the blood flowing through the conduit section 62 passes through the orifice 88, and in so doing, the pressure of the blood drops in an amount proportional to the rate of flow. This pressure drop is detected by the transducers 96 and appears on the screen of the oscilloscope 104 which can be calibrated in terms of rate of flow. An operator, observing the oscilloscope screen, can adjust the pumps of the system to control the rate of flow. Alternatively, the oscilloscope 104 may be directly connected to the venous pump 53 and the arterial pump 52 to automatically control these pumps and maintain a uniform flow into the system and thus into the patient.

Due to the relatively low pressure in the heart-lung pumping system and due to the use of a relatively large orifice 88, the pressure drop occurring as the blood flows through the orifice is not substantial and may be difficult to observe. To overcome this, the present invention contemplates the optional incorporation of a high sensitivity setting for the transducer connected to the rear pressure tube 90 as compared to the sensitivity setting of the front pressure tube 92. Thus the reading of the pressure drop will be amplified in proportion to the difference in sensitivities and a workable reading is easily obtained.

In a practical embodiment of the present invention that has been used successfully in performing a number of open heart operations, the rear pipe portion 66 and front pipe portion 74 are formed with an inner diameter of .375". The orifice plate 86 is 1/32" thick and is formed with an internal diameter of .3125". Under certain circumstances, such as when the patient is a child, the pumping system is operated at lower rates and at lower pressures, requiring the use of smaller orifices to obtain workable results. However, turbulence is reduced when pressure and flow are reduced so the reduced orifice does not increase the hazard of injury to the blood.

The rear pressure tube 90 is mounted .360" to the rear of the orifice plate 86 and the front pressure tube 92 is mounted .110" to the front of the orifice plate 86.

The hose rings 64 and 84, the pipe portions 66 and 74 and the pressure tubes 90, 92 are formed of stainless steel that are silicone coated to permit sterilization as by autoclaving and are highly polished so as not to impede or damage the blood corpuscles coming in contact therewith. The orifice plate 86 is preferably formed of a plastic, such as a tetrafluoroethylene polymer sold under the trade name "Teflon" by E. I. du Pont de Nemours & Co. "Teflon" is characterized by outstanding chemical resistance, excellent electrical properties and good heat stability. Its primary importance for use in the present invention is that it will withstand the sterilization necessary without damage or extensive wear.

Although one embodiment of the present invention is described above for purposes of illustration, it is to be understood that the present invention is not intended to be limited to that embodiment. The scope of the invention is pointed out in the appended claims.

I claim:

1. In an artificial heart-lung pumping system in which the blood of a patient is withdrawn before entering the heart and lungs and is oxygenated and returned through a conduit to the patient beyond the heart and lungs, a blood flow meter comprising a section of conduit located directly in the pumping system conduit in which blood is returned to the patient, an orifice plate mounted in said section of conduit and having an annular orifice through which the blood flows, the orifice being of a diameter less than the diameter of said section of conduit on either side of said orifice plate, means for comparing the fluid pressure of the blood on both sides of said orifice to determine the pressure drop as the blood flows through said orifice, and means for indicating said pressure drop in terms of the rate of flow proportional to the pressure drop.

2. In an artificial heart-lung pumping system in which the blood of a patient is withdrawn before entering the heart and lungs and is oxygenated and returned through a conduit to the patient beyond the heart and lungs, a blood flow meter comprising a section of conduit located directly in the pumping system conduit in which blood is returned to the patient, said section of conduit having an annular orifice formed therein through which the blood flows, the orifice being of a diameter less than the diameter of said section of conduit on either side of said orifice plate, a first pressure transmitting element attached to the conduit section and communicating with the interior of the conduit section upstream with respect to the orifice, a second pressure transmitting tube attached to the conduit section and communicating with the interior of the conduit section downstream with respect to the orifice, pressure sensitive transducers attached to each tube, said transducers transforming the pressures into electrical impulses, and means for comparing the electrical impulses produced by said transducers and indicating said comparison in terms of the rate of flow of blood.

3. The blood flow meter of claim 2 which is further characterized by the transducers including diaphragms which sense the pressure of the blood and separate the blood from the other elements in the transducer.

References Cited in the file of this patent

UNITED STATES PATENTS

| | | |
|---|---|---|
| 2,018,431 | Wolf | Oct. 22, 1935 |
| 2,688,253 | Markson | Sept. 7, 1954 |
| 2,705,493 | Malmros et al. | Apr. 5, 1955 |

FOREIGN PATENTS

| | | |
|---|---|---|
| 516,854 | Great Britain | Jan. 12, 1940 |

OTHER REFERENCES

Moe: "A Simple Technique for Continuous Registration of Blood Flow," Science, Volume 109, page 381, April 15, 1949, 128–214.

Sewell et al.: "Experimental Cardiac Surgery," Surgery, Vol. 28, No. 3, pages 474–494. (Pages 476 and 480–481 relied on.) September 1950, 128–214. (Above articles available in Science Library.)

Miller et al.: "Production and Repair of Interatrial Defects," Journal of Thoracic Surgery, Volume 26, No. 6, Pages 601–603 and 616 relied on, December 1953, 128–214.

Thomas et al.: "Experiments With the Extirpated Canine Lung as a Biologic Oxygenator," A.M.A. Archives of Surgery, Volume 75, No. 1, pages 61–68, (page 62 relied on), July 1957, 128–214. (Above articles available in Division 55.)